(12) United States Patent
Kedzierski

(10) Patent No.: US 9,056,557 B2
(45) Date of Patent: Jun. 16, 2015

(54) CONVERSION KIT FOR CONVERTING A GASOLINE POWERED MID ENGINE CAR TO AN ELECTRIC POWERED CAR

(71) Applicant: Red Point Engineering, Inc.

(72) Inventor: Norbert Kedzierski, Rochester Hills, MI (US)

(73) Assignee: Norbert Kedzierski, Rochester Hills, MI (US)

( * ) Notice: Subject to any disclaimer, the term of this patent is extended or adjusted under 35 U.S.C. 154(b) by 0 days.

(21) Appl. No.: 13/827,345

(22) Filed: Mar. 14, 2013

(65) Prior Publication Data

US 2014/0262567 A1    Sep. 18, 2014

(51) Int. Cl.
*B60K 1/00* (2006.01)
*B60L 11/18* (2006.01)
*H01M 2/00* (2006.01)

(52) U.S. Cl.
CPC ......... *B60L 11/1877* (2013.01); *B60L 11/1879* (2013.01); *H01M 2/00* (2013.01); *Y02T 10/7005* (2013.01); *Y02T 10/705* (2013.01)

(58) Field of Classification Search
USPC .............................................. 180/65.1, 68.5
See application file for complete search history.

(56) References Cited

U.S. PATENT DOCUMENTS

| 4,216,839 A * | 8/1980 | Gould et al. ............ 180/65.1 |
| 2012/0055724 A1 * | 3/2012 | Iwasa et al. ............ 180/68.5 |

* cited by examiner

*Primary Examiner* — Jeffrey J Restifo
*Assistant Examiner* — Erez Gurari
(74) *Attorney, Agent, or Firm* — Gifford, Krass, Sprinkle, Anderson & Citkowski, P.C.

(57) ABSTRACT

A conversion kit for converting a gasoline powered mid engine car to an electric powered car that includes a front battery assembly, a mid-front battery assembly, a passenger side battery assembly, a driver side battery assembly, a rear battery assembly, a mounting assembly for mounting a power controller above the driver and passenger battery assemblies, an electric motor mounting structure, and an electric motor transmission adapter connecting the electric motor to a vehicle transmission.

20 Claims, 12 Drawing Sheets

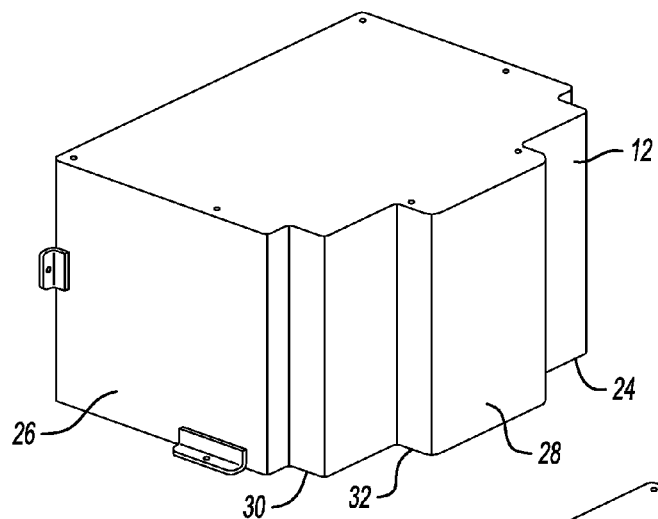
*Fig-5A*
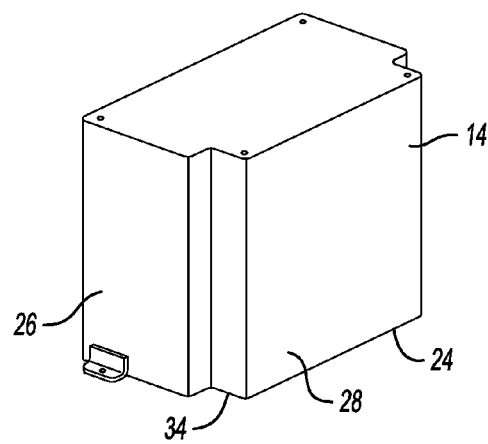
*Fig-5B*
*Fig-5C*
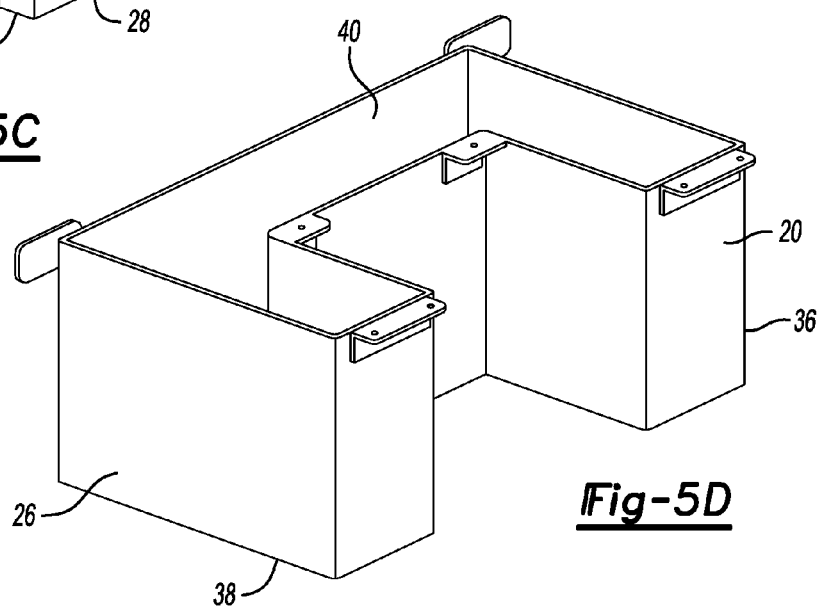
*Fig-5D*

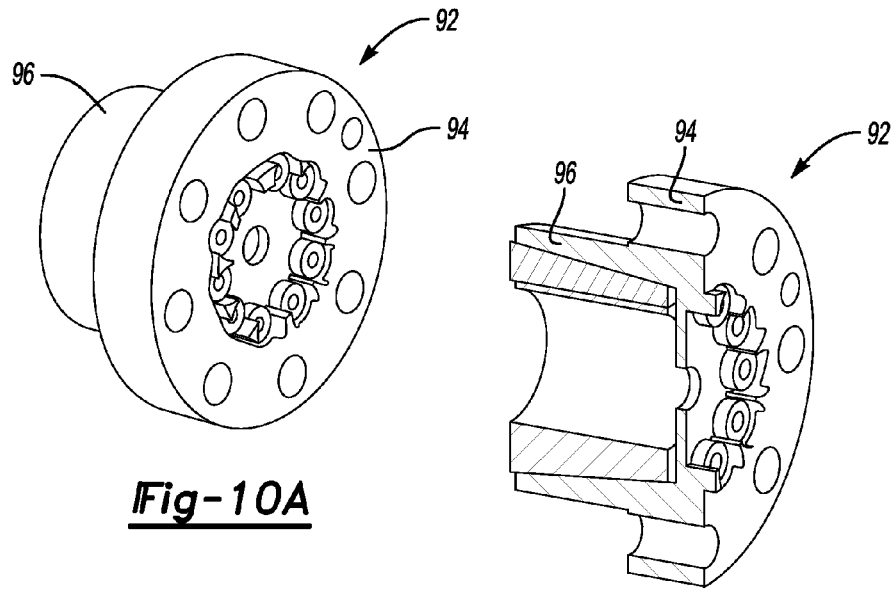
*Fig-10A*
*Fig-10B*
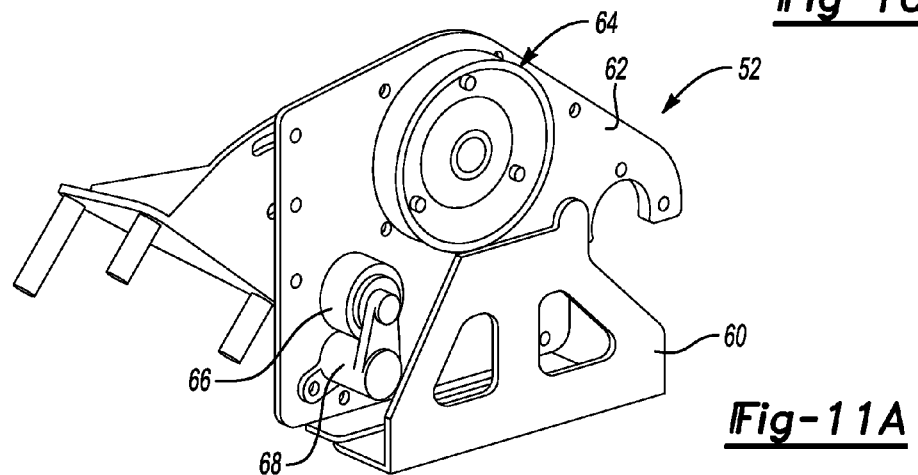
*Fig-11A*
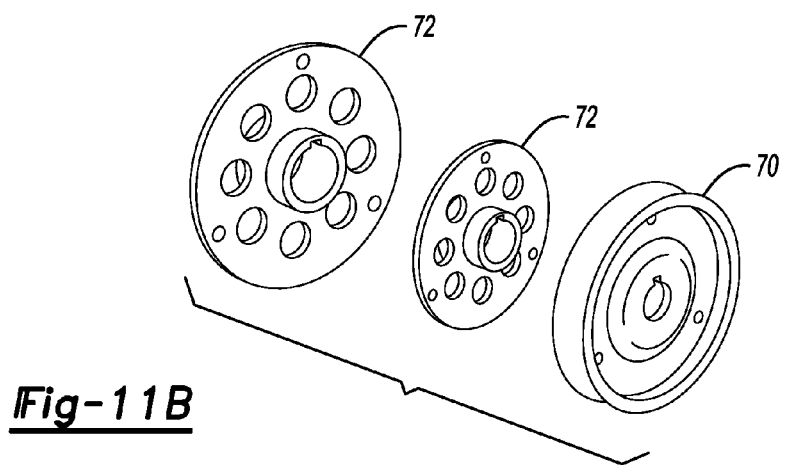
*Fig-11B*

CONVERSION KIT FOR CONVERTING A GASOLINE POWERED MID ENGINE CAR TO AN ELECTRIC POWERED CAR

FIELD OF THE INVENTION

The invention relates to conversion kits for converting gasoline powered cars to electric vehicles.

BACKGROUND OF THE INVENTION

Various motor vehicles may be converted from gasoline powered engines to full electric or EV vehicles. However, various vehicles require specific structures and have unique positions of various components allowing to properly connect electric drive train components to integrate it with an existing vehicle chassis. Particularly, a mid engine vehicle may have a specific configuration that increases the difficulty to properly integrate and package various electric vehicle components including the electric power train, battery packaging, and use of original parts from the vehicle. There is therefore a need in the art for a conversion kit that allows for converting a gasoline powered mid engine car to an electric powered car that reuses motor mounting and other components from the original vehicle as well as integrates various sensor components such as a speed sensor for a tachometer. Additionally, there is a need in the art for a conversion kit that provides battery packaging within the defined space of the original vehicle and provides even weight distribution across the vehicle frame.

SUMMARY OF THE INVENTION

In one aspect, there is disclosed a conversion kit for converting a gasoline powered mid engine car to an electric powered car that includes a front battery assembly, a mid-front battery assembly, a passenger side battery assembly, a driver side battery assembly, a rear battery assembly, a mounting assembly for mounting a power controller above the driver and passenger battery assemblies, an electric motor mounting structure, and an electric motor transmission adapter connecting the electric motor to a vehicle transmission.

In another aspect, there is disclosed a conversion kit for converting a gasoline powered mid engine car to an electric powered car that includes a front battery assembly, a mid-front battery assembly, a passenger side battery assembly, a driver side battery assembly, a rear battery assembly, a mounting assembly for mounting a power controller above the driver and passenger battery assemblies, an electric motor and electric motor mounting structure, and an electric motor transmission adapter connecting the electric motor to a vehicle transmission wherein the electric motor transmission adapter includes a plate structure having a hole formed therein, the plate including a raised peripheral wall that extends to a flange, the flange including a notch formed therein and including mounting holes formed therein.

In a further aspect, there is disclosed a conversion kit for converting a gasoline powered mid engine car to an electric powered car that includes a front battery assembly, a mid-front battery assembly, a passenger side battery assembly, a driver side battery assembly, a rear battery assembly, an electric motor, and an electric motor transmission adapter connecting the electric motor to a vehicle transmission.

BRIEF DESCRIPTION OF THE DRAWINGS

FIG. 5A-E are perspective views of the battery assemblies of the conversion kit;

FIG. 10A-B are perspective views of a hub connection;

FIG. 11A-B are an exploded and assembled perspective view of an electric motor mounting structure;

DETAILED DESCRIPTION OF THE PREFERRED EMBODIMENTS

Figure 1:
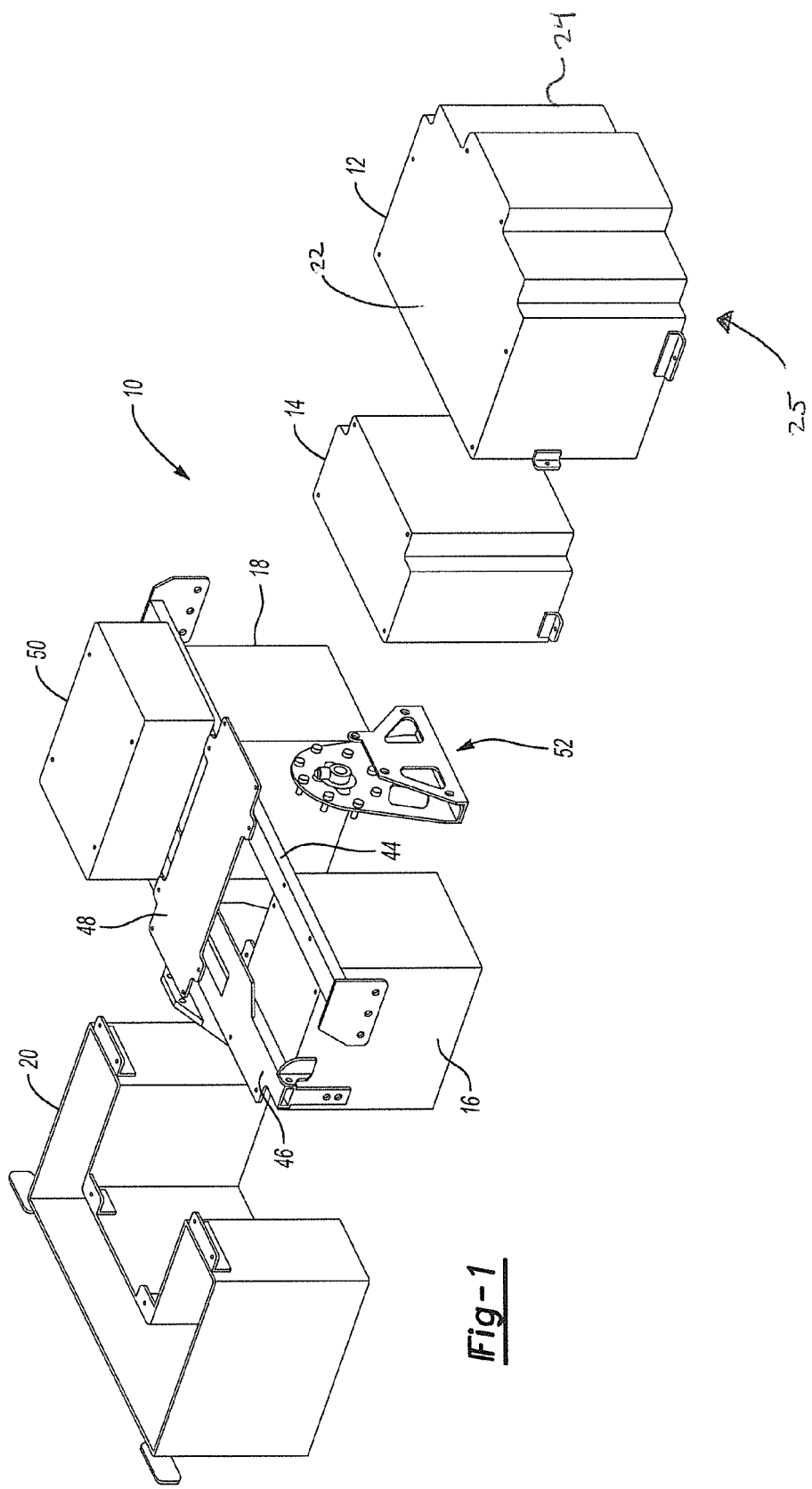
FIG. 1 is a partial perspective view of one embodiment for a manual transmission of a conversion kit.
Figure 2:
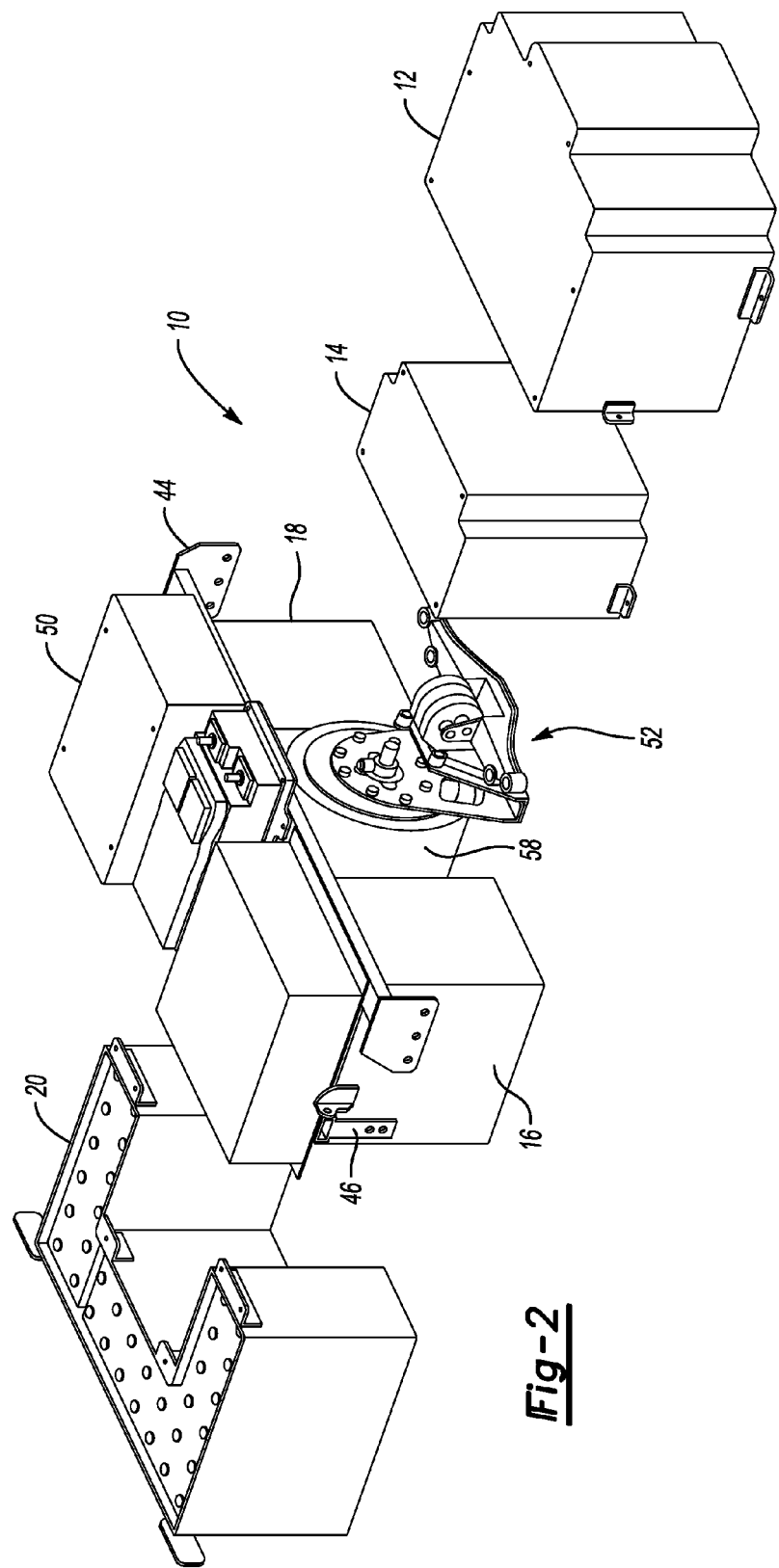
FIG. 2 is a partial perspective view of the embodiment of FIG. 1 including various accessory components.
Figure 3:
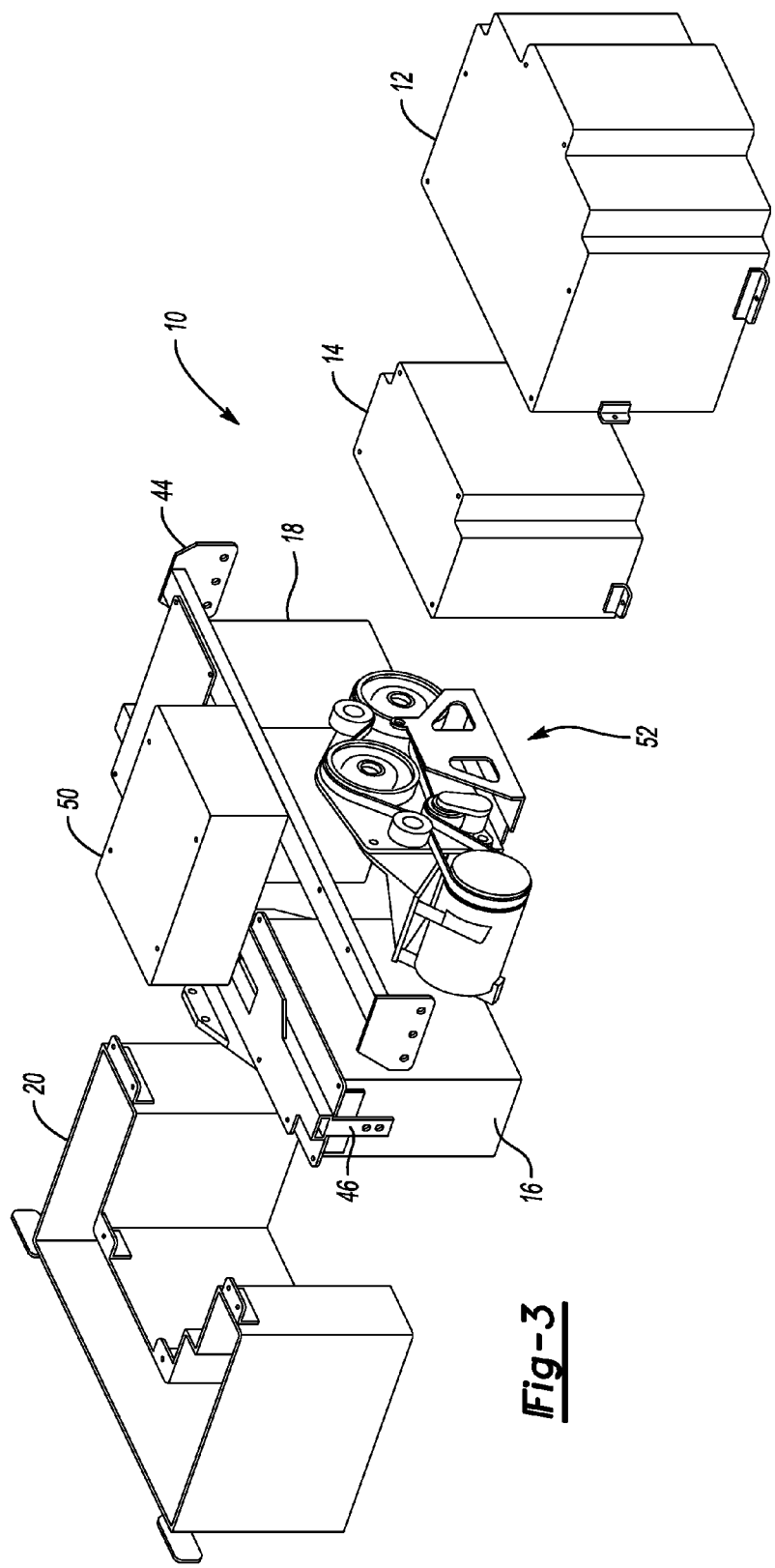
FIG. 3 is a partial perspective view of an alternative embodiment for an automatic transmission of a conversion kit.
Figure 4:
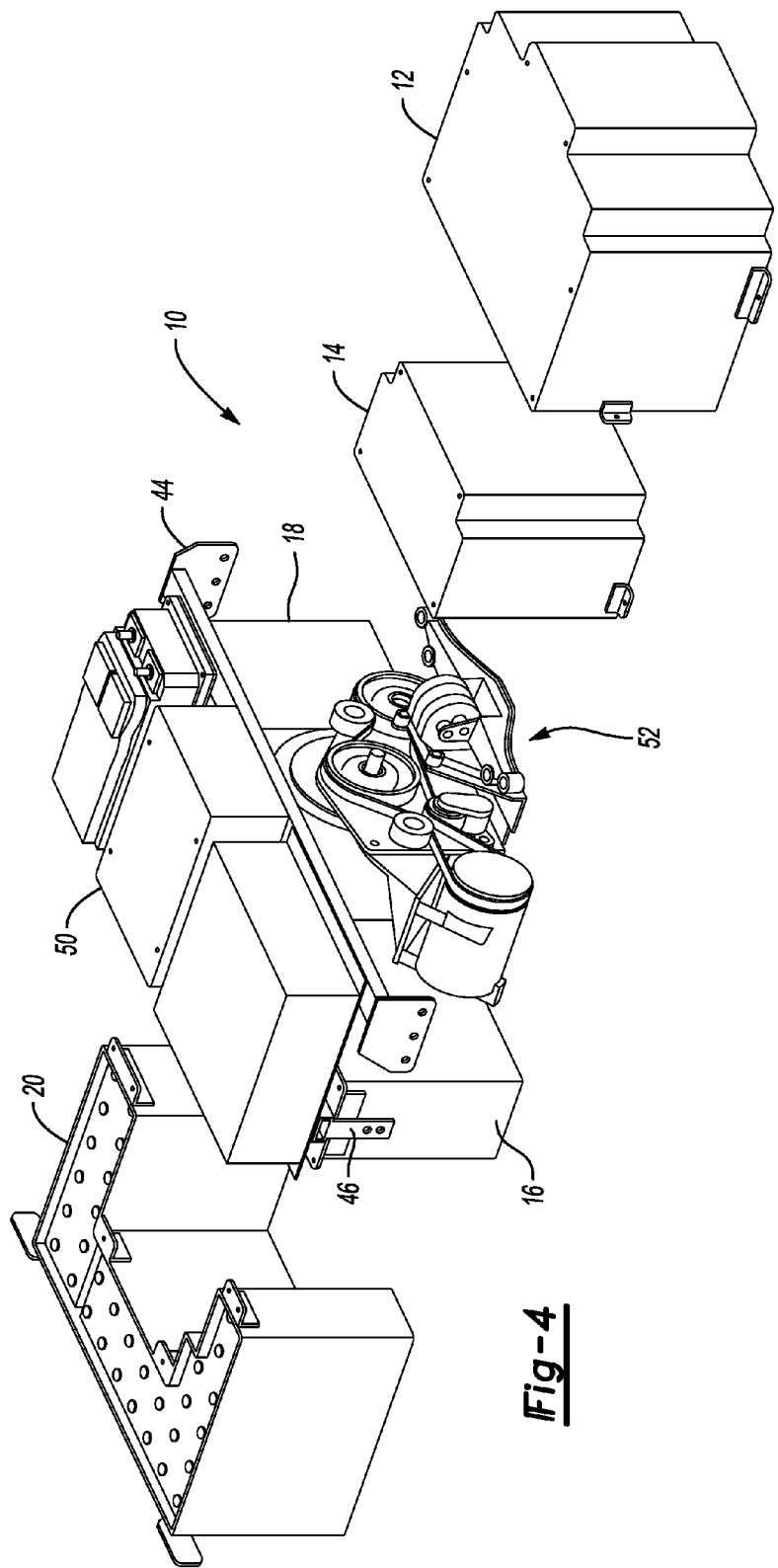
FIG. 4 is a partial perspective view of the alternative embodiment of FIG. 3 including various accessory components.
Figure 5E:
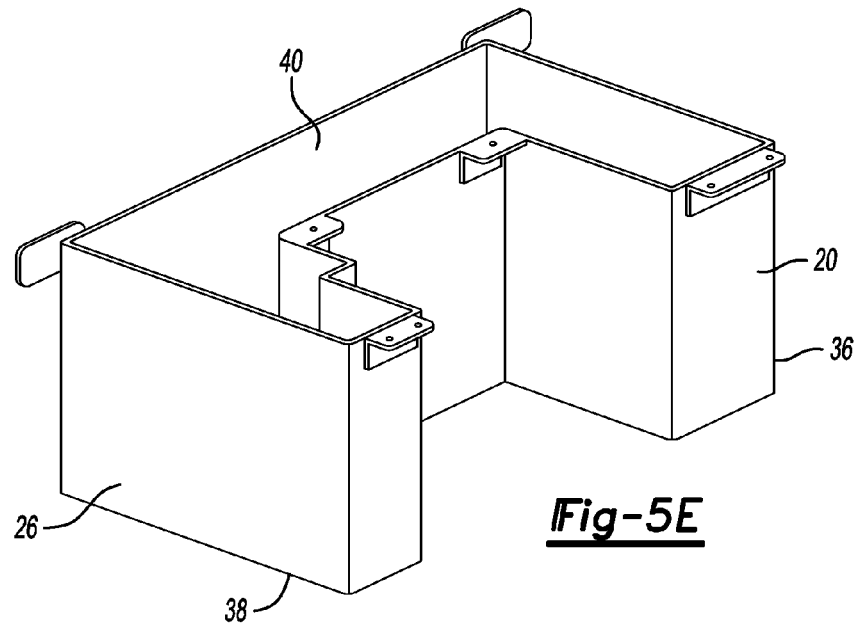
Figure 6A:
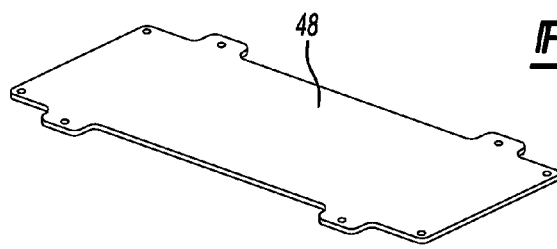
FIG. 6A-C are perspective views of the mounting assembly.
Figure 6B:
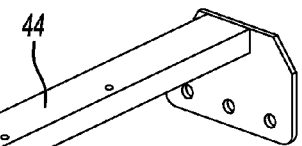
Figure 6C:
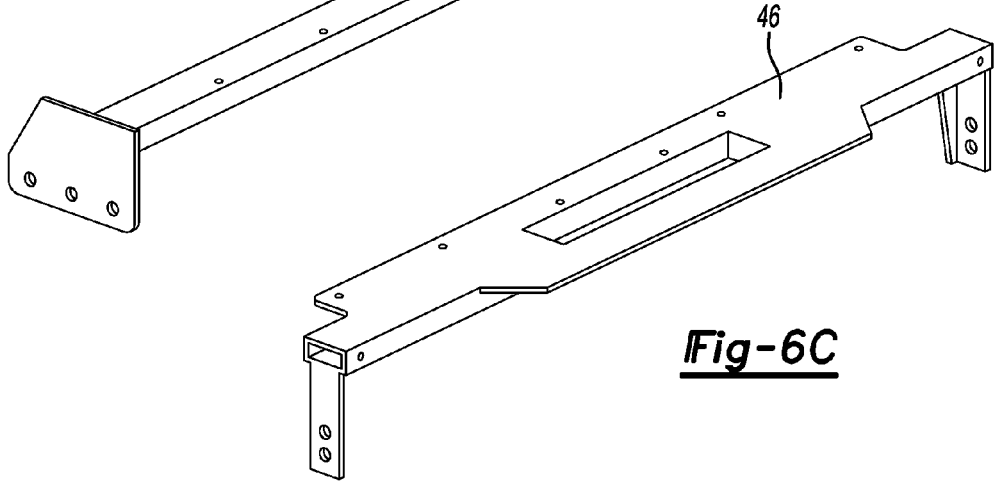
Figure 7A:
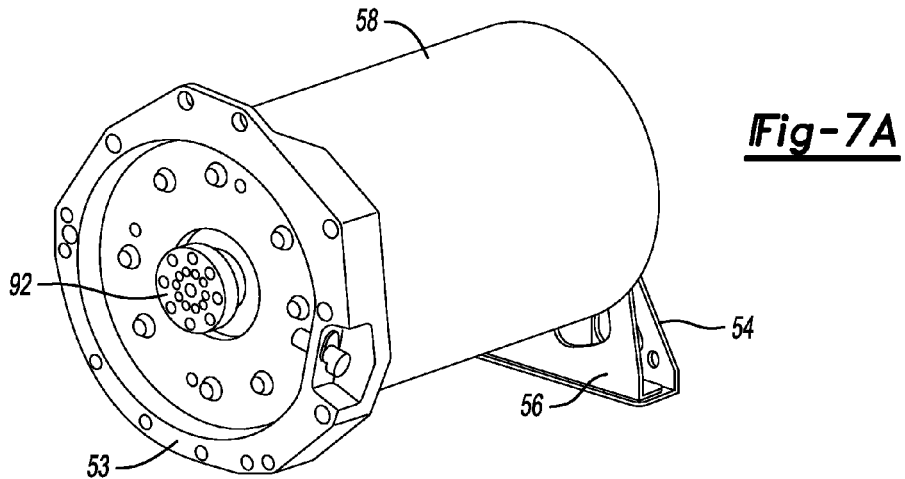
FIG. 7A-C are perspective views of an electric motor mounting structure and electric motor including the electric motor transmission adapter.
Figure 7B:
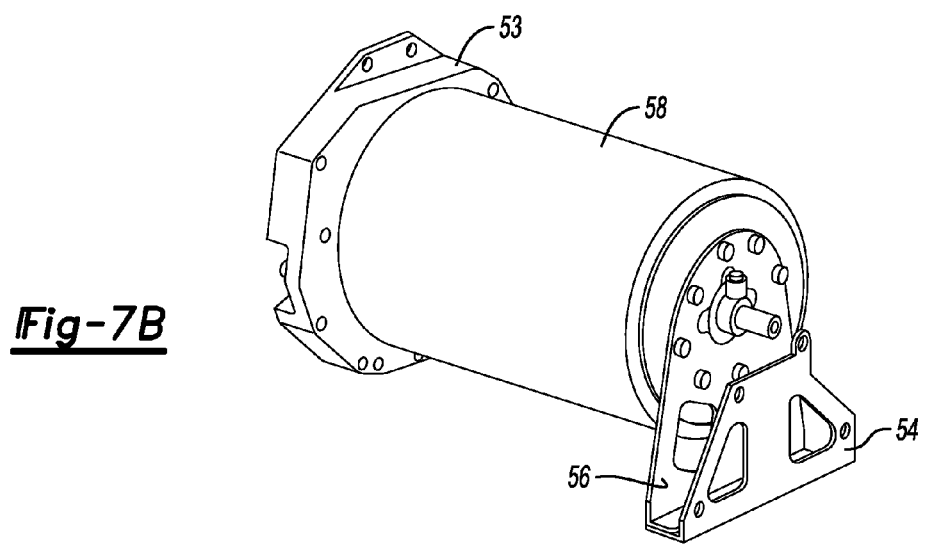
Figure 7C:
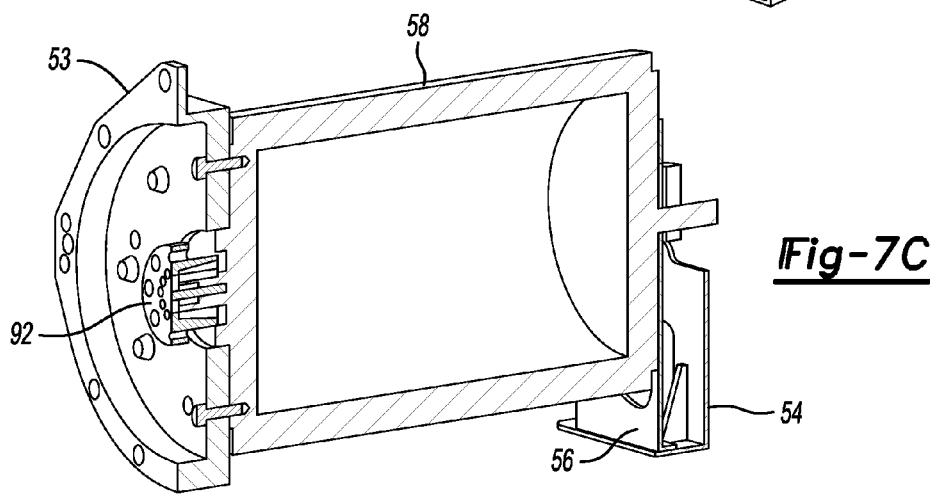
Figure 8A:
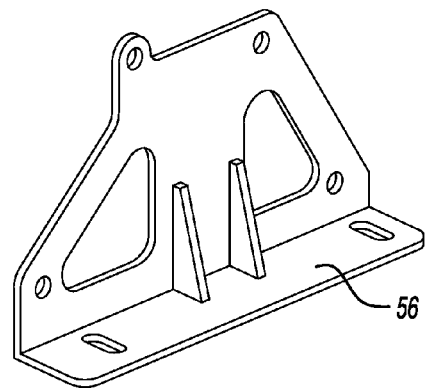
FIG. 8A-B are perspective views of the motor mounts.
Figure 8B:
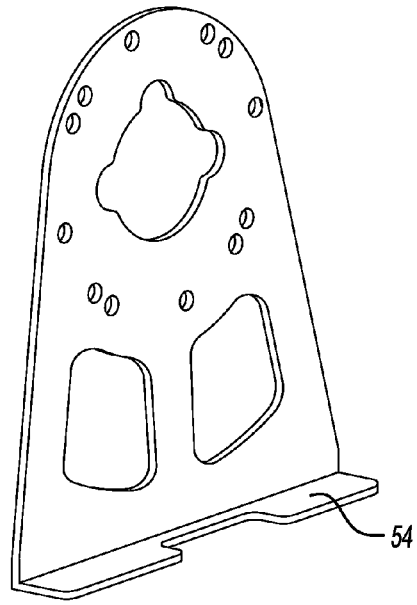

Referring to the figures, there is shown a conversion kit 10 for converting a gasoline powered mid engine car to an electric powered car. In one aspect, the conversion kit 10 includes a front battery assembly 12, a mid-front battery assembly 14, a passenger side battery assembly 16, a driver side battery assembly 18, and a rear battery assembly 20. Referring to FIG. 5A, the front battery assembly 12 includes a battery cell 22 positioned within a housing 24 and positioned or mounted in a vehicle trunk space. In one aspect the housing 24 of the front battery assembly 12 includes a box structure 26 having a front face 28 having first and second stepped portions 30, 32. Referring to FIG. 5C, the mid-front battery assembly 14 includes a battery cell 22 positioned within a housing 24. The mid-front battery assembly 14 may be mounted in a space formerly occupied by a vehicle gas tank. In one aspect, the mid-front battery assembly 14 includes a box structure 26 having a front face 28 having a stepped portion 34. Referring to FIGS. 5D-E, the rear battery assembly 20 includes a battery cell 22 positioned within a housing 24. The rear battery assembly 20 may be mounted in an engine compartment space. The housing 24 of the rear battery includes a box structure 26 having a C shape including opposing legs 36, 38 extending from an approximately perpendicular central section 40.

Referring to FIGS. 1-4, and 6A-C, a mounting assembly 42 may include front and rear cross members 44, 46 that span between the passenger side battery assembly 16 and driver side battery assembly 18. A mounting plate 48 may be attached to the front and rear cross members 44, 46 for mounting a power controller 50 above the driver and passenger battery assemblies 16, 18. Additionally, various accessories such as a cooling mechanism and other components may be mounted on the front and rear cross members 44, 46.

Referring to FIGS. 1-4, 7A-C, 8A-B, 11A-B and 12A-B, an electric motor mounting assembly 52 may be modified between the manual and automatic transmissions. Referring to FIGS. 1-2, 7A-C and 8A-B, the electric motor mounting assembly 52 for a manual transmission may include a motor side and body side mounting bracket 54, 56 positioned in opposing relation and retained relative to each other. The motor side bracket 54 may engage the electric motor 58 and the body side bracket 56 may be connected to a vehicle frame.

Referring to FIGS. 3-4 and 11A-b, 12A-B, the electric motor mounting assembly 52 may be for an automatic transmission and include a motor mounting bracket 60 connected with a motor mounting plate 62. The motor mounting plate 62 may include a pulley assembly 64 rotatively mounted therein. A guide and tension pulley 66 may be rotatively coupled to an arm 68 that is connected to the motor mounting plate 62. As shown in FIG. 11A-13, the pulley assembly 64 may include a pulley 70 that is journaled to a mounting hub 72 that is rotatively coupled to the motor mounting plate 62.

Figure 9A:
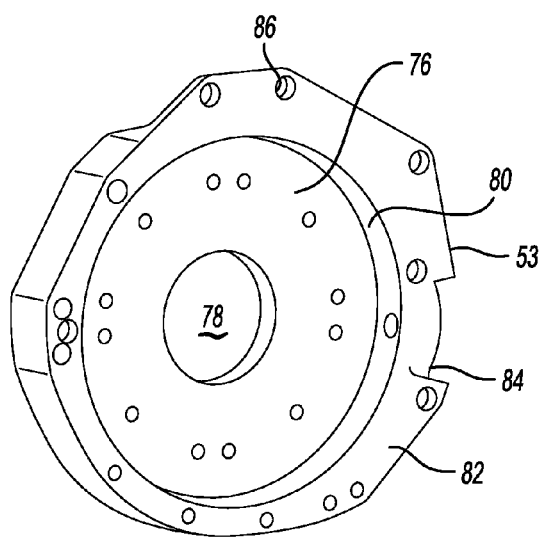
FIG. 9A-B are perspective views of the electric motor transmission adapter.

Referring to FIGS. 7A-C and 9A-B, an electric motor transmission adapter 53 as with the previously described electric motor mounting assembly 52 may be modified for use with manual and automatic transmissions. As shown in FIG. 9A, the electric motor transmission adapter 53 may be for a manual transmission and includes a plate structure 76 having a hole 78 formed therein. The plate 76 may include a raised peripheral wall 80 that extends to a flange 82. The flange 82 may include a notch 84 formed therein and also include mounting holes 86 formed therein.

Figure 9B:
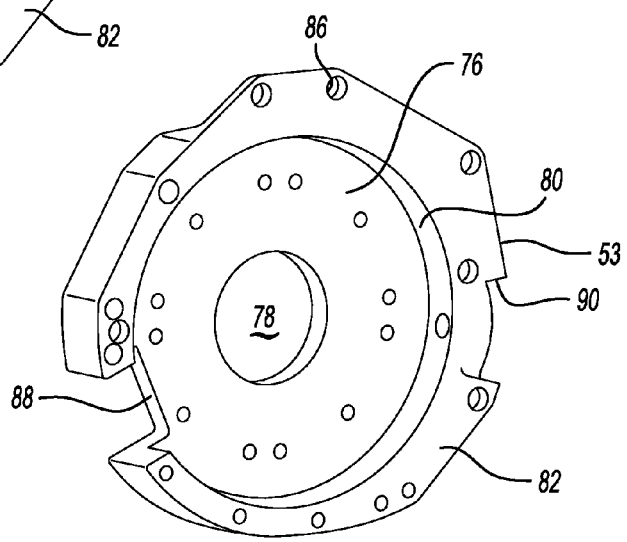
Figure 12A:
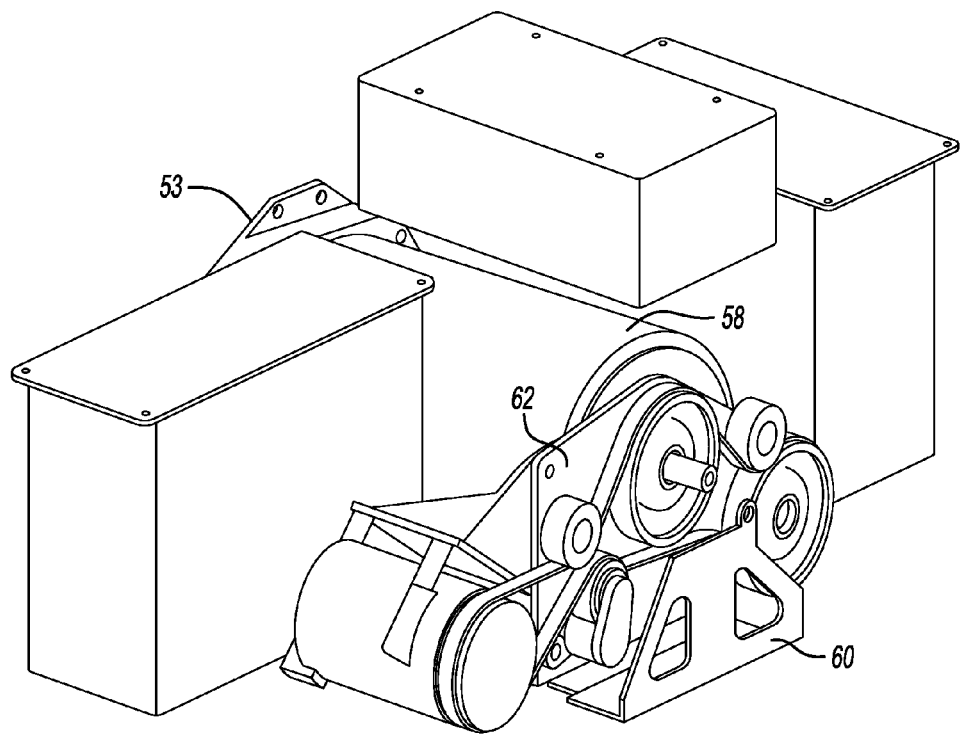
FIG. 12A-B are an exploded and assembled perspective view of an electric motor mounting structure including accessories.
Figure 12B:
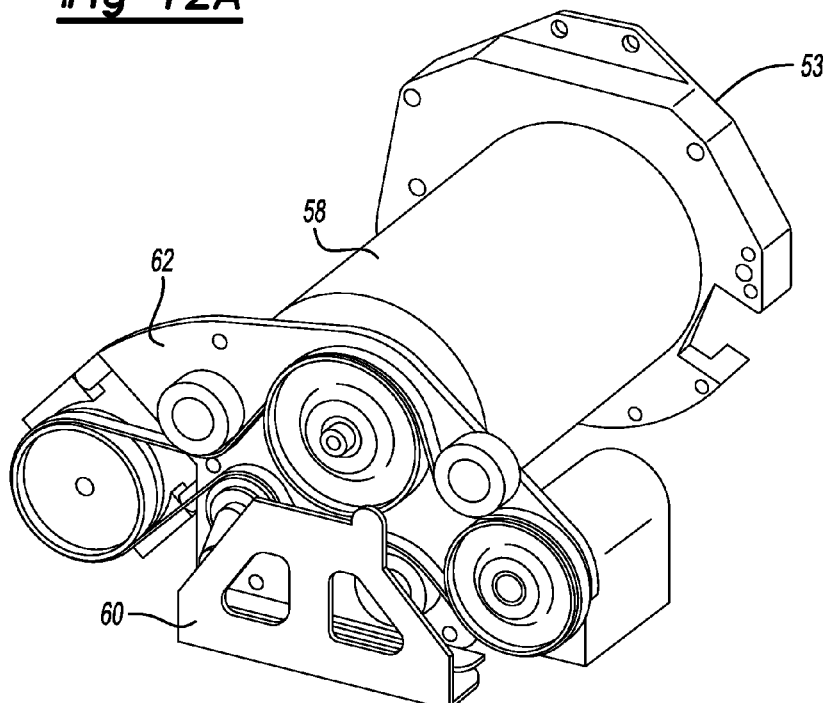
Figure 13A:
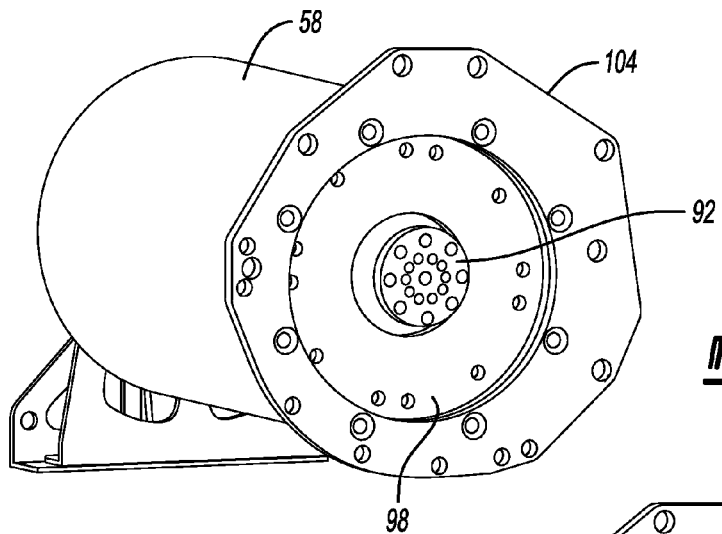
FIG. 13A-D are perspective views of an alternate embodiment of an electric motor transmission adapter.
Figure 13B:
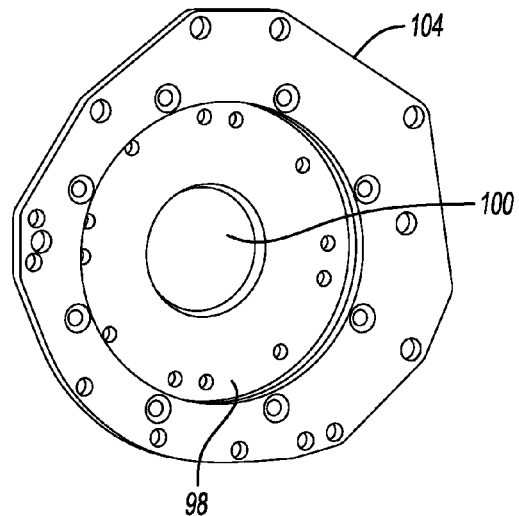
Figure 13C:
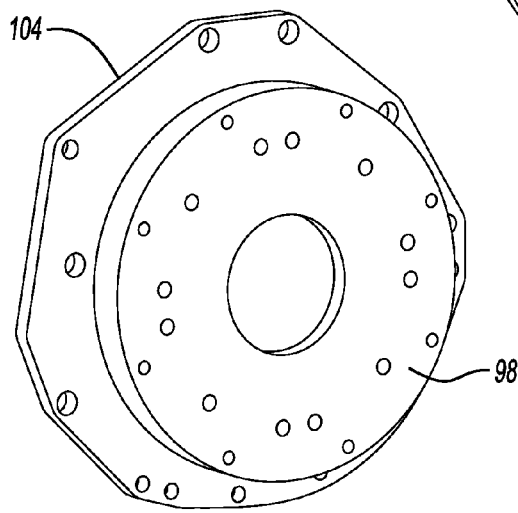
Figure 13D:
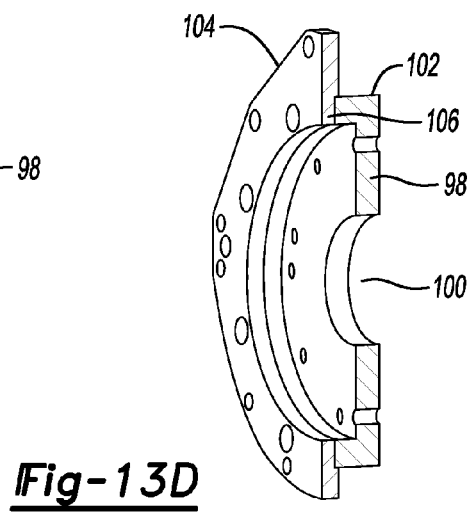
Figure 14:
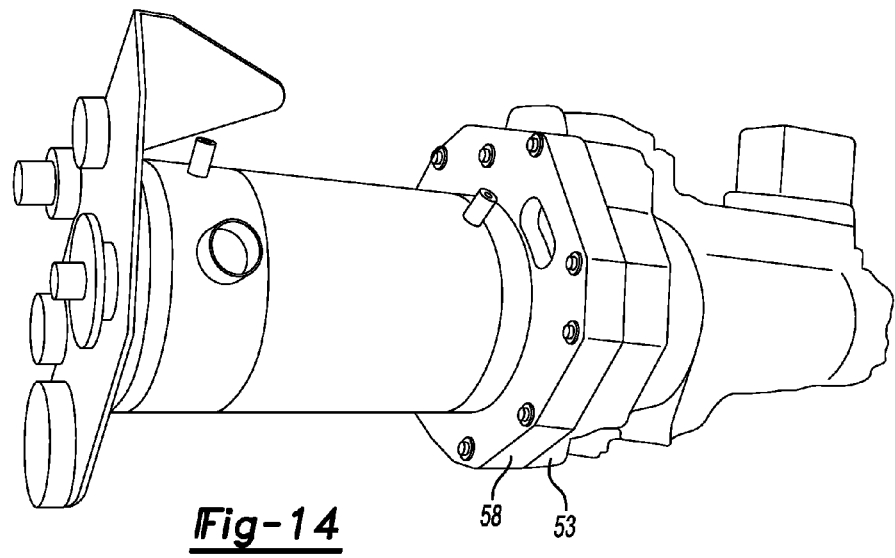
FIG. 14 is a pictorial view of the conversion kit.
Figure 15:
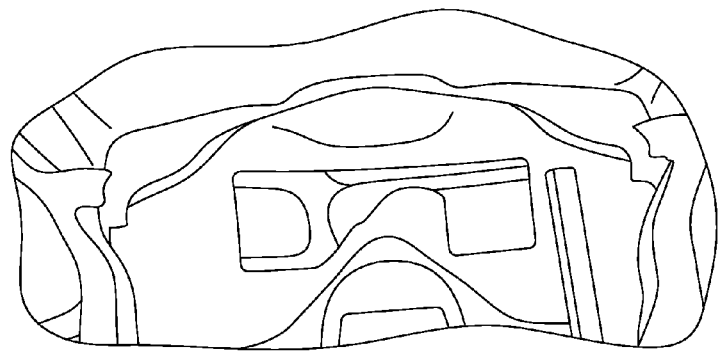
FIG. 15 is a pictorial view of the conversion kit in a car body.
Figure 16:
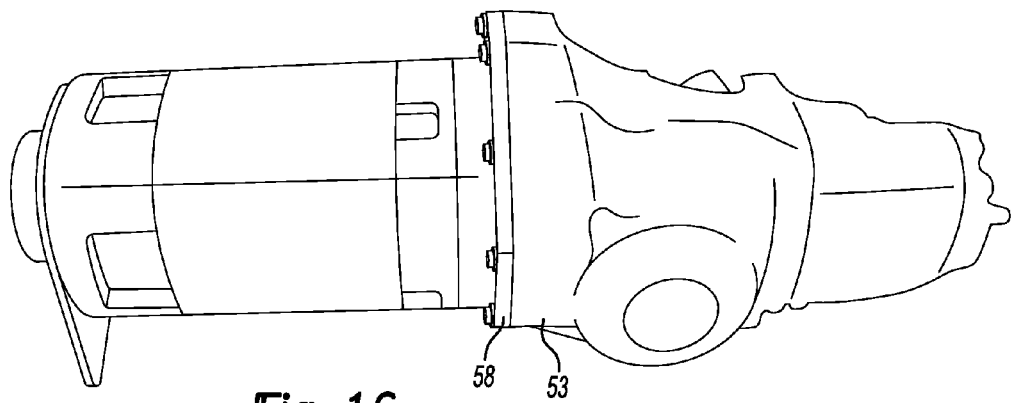
FIG. 16 is a pictorial view of the conversion kit.

The electric motor transmission adapter 53 may also be for an automatic transmission as shown in FIG. 9B and may include a plate structure 76 having a hole 78 formed therein. The plate 76 may include a notch 88 formed thereon. The plate 76 may also include a raised peripheral wall 80 that extends to a flange 82. The flange 82 may include a notch 90 formed therein and also include mounting holes 86 formed therein.

Referring to FIGS. 10A-13, the electric motor transmission adapter 53 may also include a hub connection 92 positioned in the hole 78 formed in the plate structure 76. The hub connection 92 may include a cylindrical plate 94 and an annular cylindrical member 96 connected to the cylindrical plate 94. In one aspect, the annular cylindrical member 96 may be connected to the electric motor 58. The cylindrical plate 94 may be shaped to couple with a clutch of the vehicle transmission.

Referring to FIGS. 13A-D, another alternative embodiment of electric motor transmission adapter is shown. In this embodiment, the electric motor transmission adapter 53 may include a spacer 98 having a hole 100 formed therein. The spacer 98 may include a raised peripheral wall 102. A mounting plate 104 including a notch 106 may be positioned relative to the spacer 98 such that the spacer 98 is received in the notch 106. As described above, the hub connection 92 may be positioned in the hole 100 formed in the spacer 98 as described above with reference to the plate structure 76.

The invention is not restricted to the illustrative examples described above. Examples described are not intended to limit the scope of the invention. Changes therein, other combinations of elements, and other uses will occur to those skilled in the art.

The invention claimed is:

1. A conversion kit for converting a gasoline powered mid engine car to an electric powered car comprising:
   a front battery assembly;
   a mid-front battery assembly the mid-front battery assembly includes a battery cell positioned within a housing, the mid-front battery assembly mounted in a space formerly occupied by a vehicle gas tank;
   a passenger side battery assembly;
   a driver side battery assembly;
   a rear battery assembly;
   a mounting assembly for mounting a power controller above the driver and passenger battery assemblies;
   an electric motor and electric motor mounting structure; and
   an electric motor transmission adapter connecting the electric motor to a vehicle transmission.

2. The conversion kit of claim 1 wherein the mid engine car is a mid engine boxster type vehicle.

3. The conversion kit of claim 1 wherein the front battery assembly includes a battery cell positioned within a housing, the front battery assembly mounted in a vehicle trunk space.

4. The conversion kit of claim 3 wherein the housing of the front battery includes a box structure having a front face having first and second stepped portions.

5. The conversion kit of claim 1 wherein the housing of the mid-front battery includes a box structure having a front face having a stepped portion.

6. The conversion kit of claim 1 wherein the rear battery assembly includes a battery cell positioned within a housing, the rear battery assembly mounted in an engine compartment space.

7. The conversion kit of claim 6 wherein the housing of the rear battery includes a box structure having a C shape including opposing legs extending from an approximately perpendicular central section.

8. The conversion kit of claim 1 wherein the mounting assembly includes front and rear cross members spanning between the passenger side battery assembly and driver side battery assembly and a mounting plate attached to the front and rear cross members.

9. The conversion kit of claim 1 wherein the electric motor mounting assembly is for a manual transmission and includes a motor side and body side mounting bracket positioned in opposing relation and retained relative to each other, the motor side bracket engaging the electric motor and the body side bracket connected to a vehicle frame.

10. The conversion kit of claim 1 wherein the electric motor transmission adapter is for a manual transmission and includes a plate structure having a hole formed therein, the plate including a raised peripheral wall that extends to a flange, the flange including a notch formed therein and including mounting holes formed therein.

11. The conversion kit of claim 10 including a hub connection positioned in the hole formed in the plate structure, the hub connection including a cylindrical plate and an annular cylinder connected to the cylindrical plate and connected to the electric motor, the cylindrical plate shaped to couple with a clutch of the vehicle transmission.

12. The conversion kit of claim 1 wherein the electric motor transmission adapter is for an automatic transmission and includes a plate structure having a hole formed therein, the plate including a notch formed thereon, the plate including a raised peripheral wall that extends to a flange, the flange including a notch formed therein and including mounting holes formed therein.

13. The conversion kit of claim 12 including a hub connection positioned in the hole formed in the plate structure, the hub connection including a cylindrical plate and an annular cylinder connected to the cylindrical plate and connected to the electric motor, the cylindrical plate shaped to couple with a clutch of the vehicle transmission.

14. The conversion kit of claim 1 wherein the electric motor transmission adapter includes a spacer having a hole formed therein, the spacer including a raised peripheral wall and a mounting plate including a notch formed thereon, the notch receiving the wall of the spacer.

15. The conversion kit of claim 1 wherein the electric motor mounting assembly is for an automatic transmission and includes a motor mounting bracket connected with a motor mounting plate, the motor mounting plate including a pulley assembly rotatively mounted therein and a guide and tension pulley rotatively coupled to an arm connected to the motor mounting plate.

16. The conversion kit of claim 15 wherein the pulley assembly includes a pulley journaled to a mounting hub that is rotatively coupled to the motor mounting plate.

17. A conversion kit for converting a gasoline powered mid engine car to an electric powered car comprising:
    a front battery assembly;
    a mid-front battery assembly;
    a passenger side battery assembly;
    a driver side battery assembly;
    a rear battery assembly;
    a mounting assembly for mounting a power controller above the driver and passenger battery assemblies;
    an electric motor and electric motor mounting structure; and
    an electric motor transmission adapter connecting the electric motor to a vehicle transmission;
    wherein the electric motor transmission adapter includes a plate structure having a hole formed therein, the plate including a raised peripheral wall that extends to a flange, the flange including a notch formed therein and including mounting holes formed therein.

18. A conversion kit for converting a gasoline powered mid engine car to an electric powered car comprising:
    a front battery assembly;
    a mid-front battery assembly;
    a passenger side battery assembly;
    a driver side battery assembly;
    a rear battery assembly;
    an electric motor and electric motor mounting structure; and
    an electric motor transmission adapter connecting the electric motor to a vehicle transmission, the electric motor transmission adapter includes a plate structure having a hole formed therein, the plate including a notch formed thereon, the plate including a raised peripheral wall that extends to a flange, the flange including a notch formed therein and including mounting holes formed therein.

19. A conversion kit for converting a gasoline powered mid engine car to an electric powered car comprising:
    a front battery assembly;
    a mid-front battery assembly;
    a passenger side battery assembly;
    a driver side battery assembly;
    a rear battery assembly;
    an electric motor and electric motor mounting structure; and
    an electric motor transmission adapter connecting the electric motor to a vehicle transmission, the electric motor transmission adapter includes a spacer having a hole formed therein, the spacer including a raised peripheral wall and a mounting plate including a notch formed thereon, the notch receiving the wall of the spacer.

20. A conversion kit for converting a gasoline powered mid engine car to an electric powered car comprising:
    a front battery assembly;
    a mid-front battery assembly;
    a passenger side battery assembly;
    a driver side battery assembly;
    a rear battery assembly;
    an electric motor and electric motor mounting structure; and
    an electric motor transmission adapter connecting the electric motor to a vehicle transmission, the electric motor mounting structure includes a motor mounting bracket connected with a motor mounting plate, the motor mounting plate including a pulley assembly rotatively mounted therein and a guide and tension pulley rotatively coupled to an arm connected to the motor mounting plate.

* * * * *